United States Patent [19]

Rüdinger et al.

[11] Patent Number: 4,728,426

[45] Date of Patent: Mar. 1, 1988

[54] FILTER PACK

[75] Inventors: Volker Rüdinger, Stutensee; Hans Leibold, Ettlingen; Ulrich Schlör, Darmstadt; Werner Alken, Weinheim, all of Fed. Rep. of Germany

[73] Assignee: Kernforschungszentrum Karlsruhe GmbH, Karlsruhe, Fed. Rep. of Germany

[21] Appl. No.: 938,715

[22] Filed: Dec. 4, 1986

[30] Foreign Application Priority Data

Dec. 5, 1985 [DE] Fed. Rep. of Germany ....... 3542963

[51] Int. Cl.⁴ ............................................. B01D 27/06
[52] U.S. Cl. .............................. 210/493.3; 210/493.5; 55/500
[58] Field of Search ............... 55/500, 521; 210/493.3, 210/493.5

[56] References Cited

U.S. PATENT DOCUMENTS

| 2,952,333 | 9/1960 | Bush | 55/500 |
| 3,242,656 | 3/1966 | Murphy | 55/500 |
| 3,941,571 | 4/1975 | Getzin | 55/500 |

FOREIGN PATENT DOCUMENTS

| 2557444 | 12/1975 | Fed. Rep. of Germany. | |
| 2071364 | 9/1971 | France | 55/500 |
| 394065 | 1/1974 | U.S.S.R. | 55/521 |

Primary Examiner—Bernard Nozick
Attorney, Agent, or Firm—Spencer & Frank

[57] ABSTRACT

A filter pack for gas and/or liquid filtration employing filter medium surfaces disposed between pairs of spacers, with the spacers having a corrugated configuration and the edges of the corrugations of each spacer preferably being mutually parallel to one another, the improvement wherein the edges of the corrugations of the spacers placed adjacent to the two sides of one filter medium surface are locally oriented at an angle toward one another.

9 Claims, 3 Drawing Figures

FILTER PACK

BACKGROUND OF THE INVENTION

The present invention relates to a filter pack for and/or liquid filtration employing filter medium surfaces disposed between pairs of spacers, with the spacers having a corrugated shape and the edges of the corrugations of each spacer being preferably mutually parallel.

A similar filter pack is disclosed in DE-OS No. 2,557,444 corresponding to U.S. Pat. No. 3,941,571. The prior art filter pack is composed of a flow-through housing holding a pleated filter or filter medium surface which is adapted to the cross section of the housing. The pleated filter is composed of a strip which is folded back and forth in a meandering pattern over a plurality of its length sections. A pleat spacer is inserted into each pleat. Each spacer is provided with a plurality of generally parallel double-sided corrugations or pleats.

However, it is also desirable to ensure the filtering of, e.g., suspended matter out of streams of air or gas with a very high degree of separation ($\eta \geqq 99.97\%$) also under extreme operating conditions such as increased temperatures, high humidity and high differential pressure. The configuration of the prior art filter pack does not assure meeting this requirement since under stress, for example due to increased differential pressure and possibly in conjunction with high humidity, the pleated filter can tear open. This happens particularly in the arc regions of the meander of the filter medium surface.

Tests have shown that loosening of the filter pack and bulging of individual pleats are two fo the most significant causes of damage. The reason for this is the uncoordinated installation of the individual pleated spacers. During filtering, this causes that either the forces from the pre-tensioned frame and/or the forces from the differential pressure be substantially conducted over the filter medium. As such, if the differential pressure rises under conditions of high humidity and temperature the filter medium is then permanently stretched. This reduces its prior tension and loosens the packed pleats.

On the other hand, excessive pressure results in the deformation of the filter medium and in the development of play between the spacers and the filter medium. As a consequence of this, lateral displacement of the pleats can easily ensue which causes individual pleats to bulge out.

SUMMARY OF THE INVENTION

It is an object of the present invention to improve the resistance to stresses of a filter pack of the above mentioned type under extreme operating conditions and/or cleaning. In such a filter pack, the forces developed are transmitted exclusively over the spacers. This permits the filter medium surfaces to thus remain reliably free of tensile stresses.

The above and other objects are attained by the filter pack of the invention for gas and/or liquid filtration comprising filter medium surfaces and a plurality of spacers, with each surface having two sides and being disposed between a respective pair of spacers, and wherein each spacer has two connecting edges and a corrugated configuration, and the edges of the corrugations of each spacer are parallel to one another, the improvement wherein the corrugations of the spacers adjacent the two sides of one filter medium surface are locally oriented at an angle toward one another.

A more complete appreciation of the invention and many of the attendant advantages thereof will be readily perceived as the same becomes better understood by reference to the following detailed description when considered in connection with the accompanying figures.

DESCRIPTION OF THE PREFERRED EMBODIMENTS

According to the invention, the forces acting on the filter medium surfaces are transmitted in a particularly advantageous manner exclusively over the spacers. Thus, in the areas of contact the filter medium disposed between the spacers is stressed only by pressure. As such, situations in which the freely suspended filter medium supports the edges or arcs of the spacers are reliably prevented.

This also increases the differential pressure carrying capability of the deeply pleated filter elements at least in three different ways. The pre-tension of the filter pack in the frame remains unchanged. If there is high differential pressure, bulging of individual pleats is prevented and there is no lateral movement of the pleats.

A further advantage of the filter pack according to the invention is that pressure increases are prevented or can be compensated. Also, transverse mixing or reduction in weight can be attained by means of perforations provided in the spacers. An additional advantage exists in that an extremely reliable frontal face seal can be attained due to the particular configuration of the edges of the spacers.

The invention will now be described in more detail, in reference to particular embodiments thereof.

Figure 1:
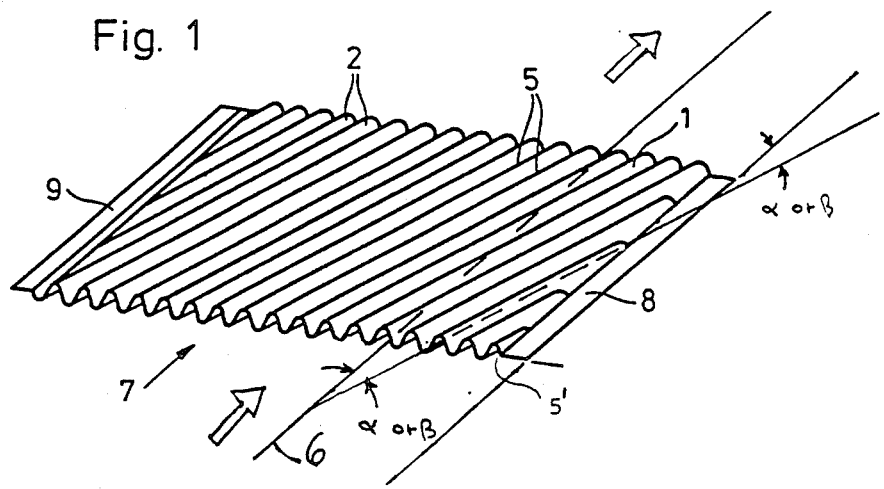
FIG. 1 is a top perspective view of a spacer.
Figure 2:
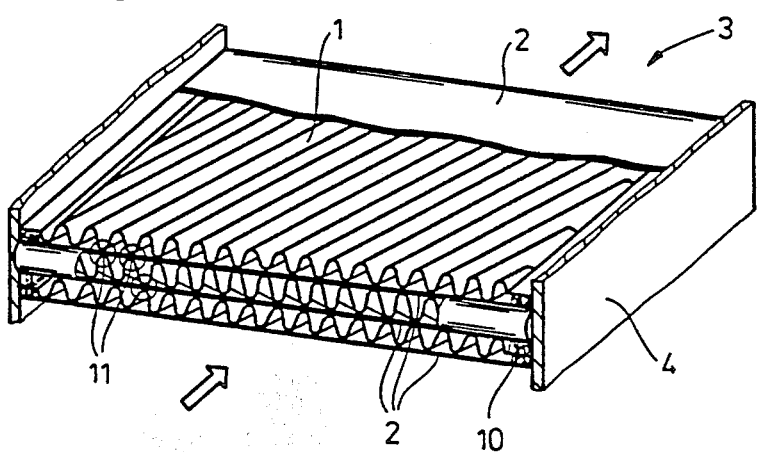
FIG. 2 is a top sectional perspective view of three spacers in an opened filter pack.

FIGS. 1 and 2 show a spacer 1 as it is placed between the pleats, or filter medium surfaces, 2 of a filter pack 3 in a housing 4, preferably having a square cross section into wihch the stream enters at the frontal face.

Spacer 1 can be seen in FIG. 1. It has a surface which is corrugated and is particularly arranged in a sinuous, or undulating pattern to have alternating ridges and hollows. It is composed of a material having sufficient stability such as a metal foil, plastic, paper or the like. The surface may also be made permeable, for example by using woven or non-woven materials or by making perforations therein in the various forms such as holes or slits.

The peaks, edges, or ridges, 5 of spacer 1 are mutually parallel at least within certain regions. The ridges 5 may also be heavy themselves. The peaks, edges and ridges enclose an angle $\alpha$ or $\beta$ of 1° to 45°, respectively and preferably 15°, with an imaginary straight line 6 that is parallel to the flow stream and perpendicular to the spacer frontal face 7 whichis itself oriented at 90° to the plane of the spacer.

The ridges of spacer 1 and hollows of spacer 1' (see FIG. 3) form an angle of between about 2° and 90° therebetween, preferably about 30°.

Edges 8, 9, each of which intersects the ridges at a plurality of locations therealong (five in FIGS. 1 and 2), are provided for a tight connection to housing 4. The edges have a desired straight unprofiled termination precisely over a width of, e.g., 2 mm to 15 mm. This simplifies the gluing of spacers 1 into the housing and primarily facilitates a tight seal.

FIG. 2 shows three spacers 1 of filter pack 3 of the embodiment according to FIG. 1. The spacers 1 are disposed in housing 4 between three layers of filter medium surface or pleats 2 with one end of the pleats being broken open. The stream through filter pack 3 flows in the direction of the arrow. Gluing spacers 1 into housing 4 makes the latter completely tight since the sealing material 10 in its flowable state penetrates into the edge regions of housing 4 between all the spacers 1 and the pleats 2.

Figure 3:
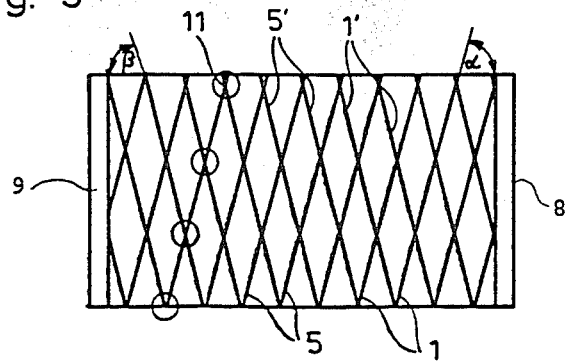
FIG. 3 is a simplified plan view of the filter pack seen perpendicularly to the direction of the air flow. Other objects, advantages and features of the present invention will become apparent to those skilled in the art from the following discussion.

In FIG. 3, the pleat or filter medium between the two spacers 1 and 1' contacting it has been omitted for reasons of clarity, and the crests of ridges 5 and 5' and their slope angles $\alpha$ and $\beta$ are shown. The two angles $\alpha$ and $\beta$ need not be identical. The ridges 5 have precisely the desired relationship at the same geometrical points, e.g., at the beginning of the peaks, due to the mirror image arrangement of the respectively associated pair of spacers 1 and 1'. The multitude of contact points 11 between the two spacers 1 and 1' with the pleats 2 disposed therebetween are marked by circles in FIG. 3.

DESCRIPTION OF AN EXEMPLARY SPACER

Typical spacers which have been employed in prototype filter packs were fabricated from 0.05-mm aluminum alloy and had a corrugation height of 3.8 mm and a distance of 10 mm between adjacent corrugation peaks. The angle $\alpha$ used was 15°. The length of the spacers was 570 mm and the width 270 mm.

The present disclosure relates to the subject matter disclosed in German Pat. No. P 35 42 963.1 filed Dec. 5, 1985, the entire specification of which is incorporated herein by reference.

The invention now being fully described, it will be apparent to one of ordinary skill in the art that many changes and modifications can be made thereto without departing from the spirit or scope of the invention as set forth herein.

What is claimed is:

1. In a filter pack for fluid filtration, comprising means defining filter medium surfaces forming a folded filter medium and a plurality of spacers, with each surface having two sides and being disposed between a respective pair of the spacers and wherein each spacer has two connecting edges and a corrugated configuration, the improvement wherein:
    the corrugations of each respective pair of spacers adjacent the two sides of one filter medium surface are locally oriented at an angle toward one another;
    respective pluralities of the corrugations of each of the spacers of each respective pair of spacers intersect the respective two connecting edges; and
    each spacer and the connecting edges thereof are disposed on a same side of one of the filter medium surfaces in contact therewith and the connecting edges have a straight uncorrugated termination terminating on said same side.

2. The improvement as in claim 1, wherein said respective plurality of corrugations of each of the spacers of each said respective pair of spacers each comprises at least four corrugations.

3. The filter pack of claim 1, wherein
    the corrugations of each spacer are parallel to one another.

4. The filter pack of claim 1, wherein
    the corrugations on both sides of each filter medium surface are oriented toward one another to provide a plurality of contact points with each filter medium surface and to support one another.

5. The filter pack of claim 1, wherein
    the spacers are configured to be permeable to at least one of gas and liquids.

6. The filter pack of claim 1, wherein the angle is between about 2° and 90°.

7. The filter pack of claim 1, wherein the angle is about 30°.

8. In a filter pack for fluid filtration, comprising a housing and means in the housing defining filter medium surfaces forming a folded filter medium and a plurality of spacers, with each surface having two sides and being disposed between a respective pair of the spacers and wherein each spacer has two connecting edges and a corrugated configuration, the improvement wherein:
    the corrugations of each respective pair of spacers adjacent the two sides of one filter medium surface are locally oriented at an angle toward one another;
    a plurality of the corrugations of each of the spacers of each said respective pair of spacers intersects each of the two connecting edges;
    the connecting edges of each spacer have a straight uncorrugated termination; and
    the filter pack further comprises glue penetrating between all of the spacers and filter medium surfaces and tightly sealing the straight uncorrugated termination of the connecting edges of each spacer to said housing.

9. The improvement as in claim 8 wherein each spacer and the connecting edges thereof are disposed on a same side of one of the filter medium surfaces in contact therewith and the straight uncorrugated terminations of the connecting edges terminate on said same side.

* * * * *